C. H. MORRISON AND F. H. NICHOLSON.
SIGNAL APPARATUS.
APPLICATION FILED JULY 31, 1918.

1,340,970.

Patented May 25, 1920.

INVENTORS
Charles H. Morrison
Frank H. Nicholson
BY
ATTORNEY

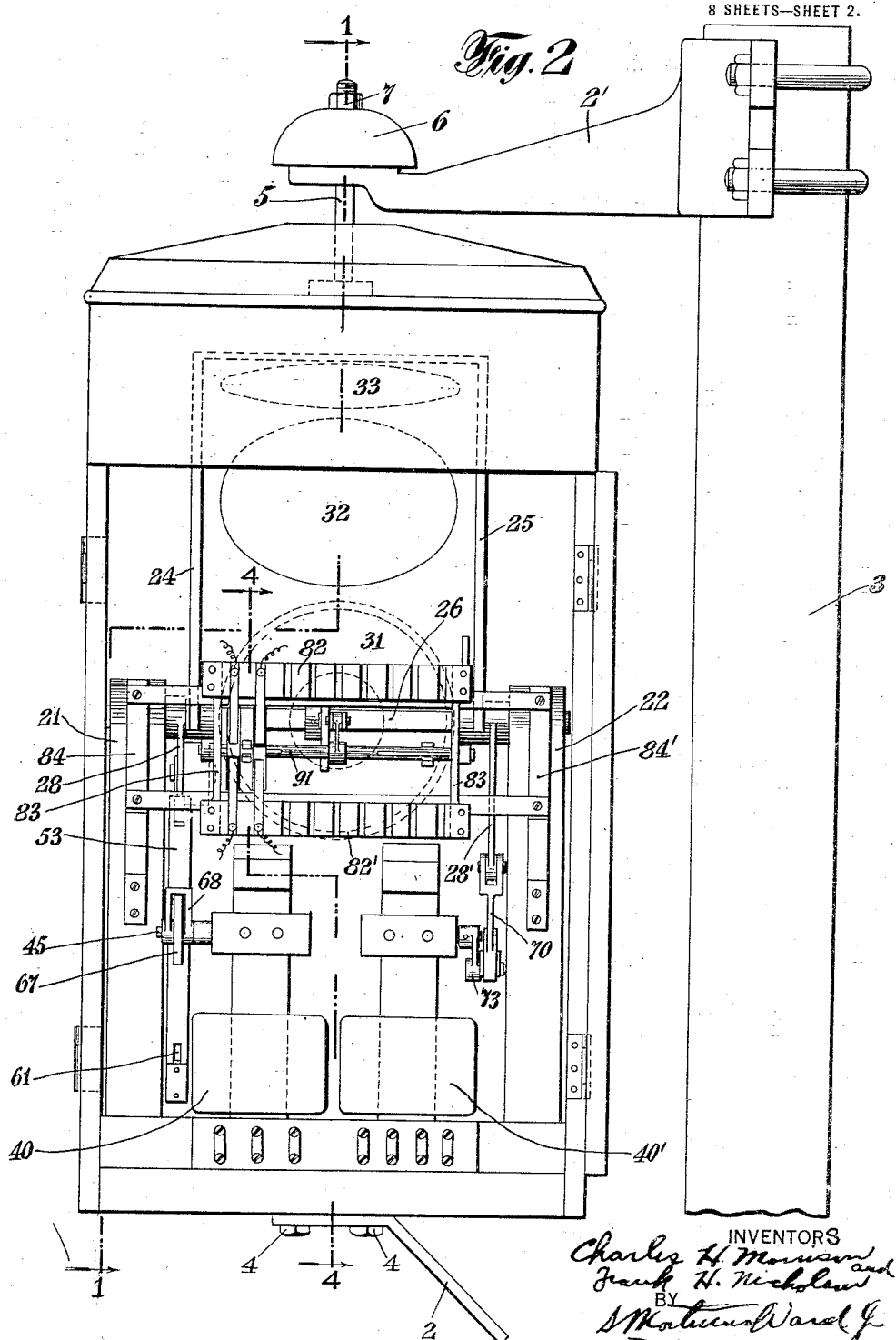

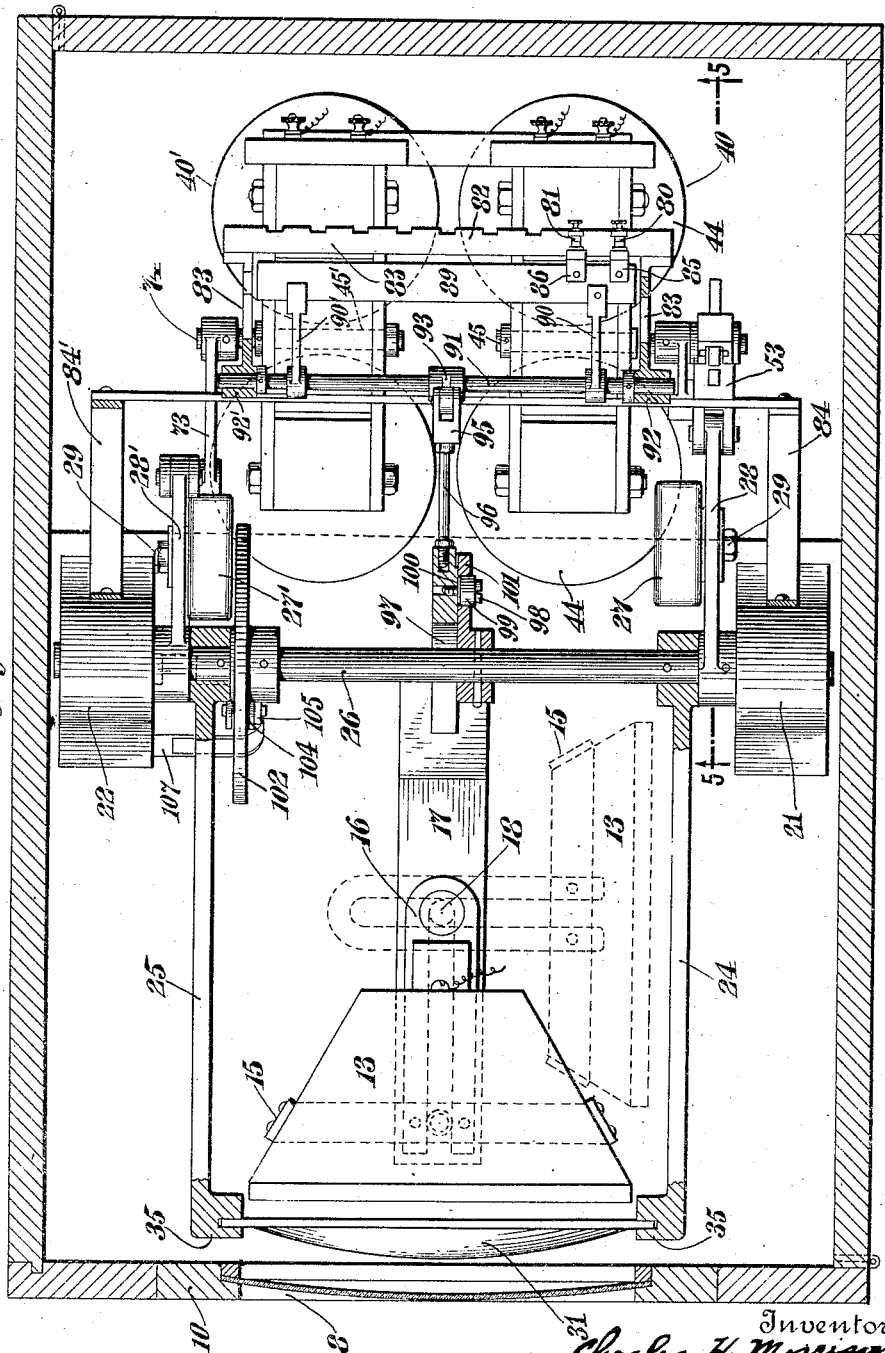

C. H. MORRISON AND F. H. NICHOLSON.
SIGNAL APPARATUS.
APPLICATION FILED JULY 31, 1918.
1,340,970.
Patented May 25, 1920.
8 SHEETS—SHEET 4.
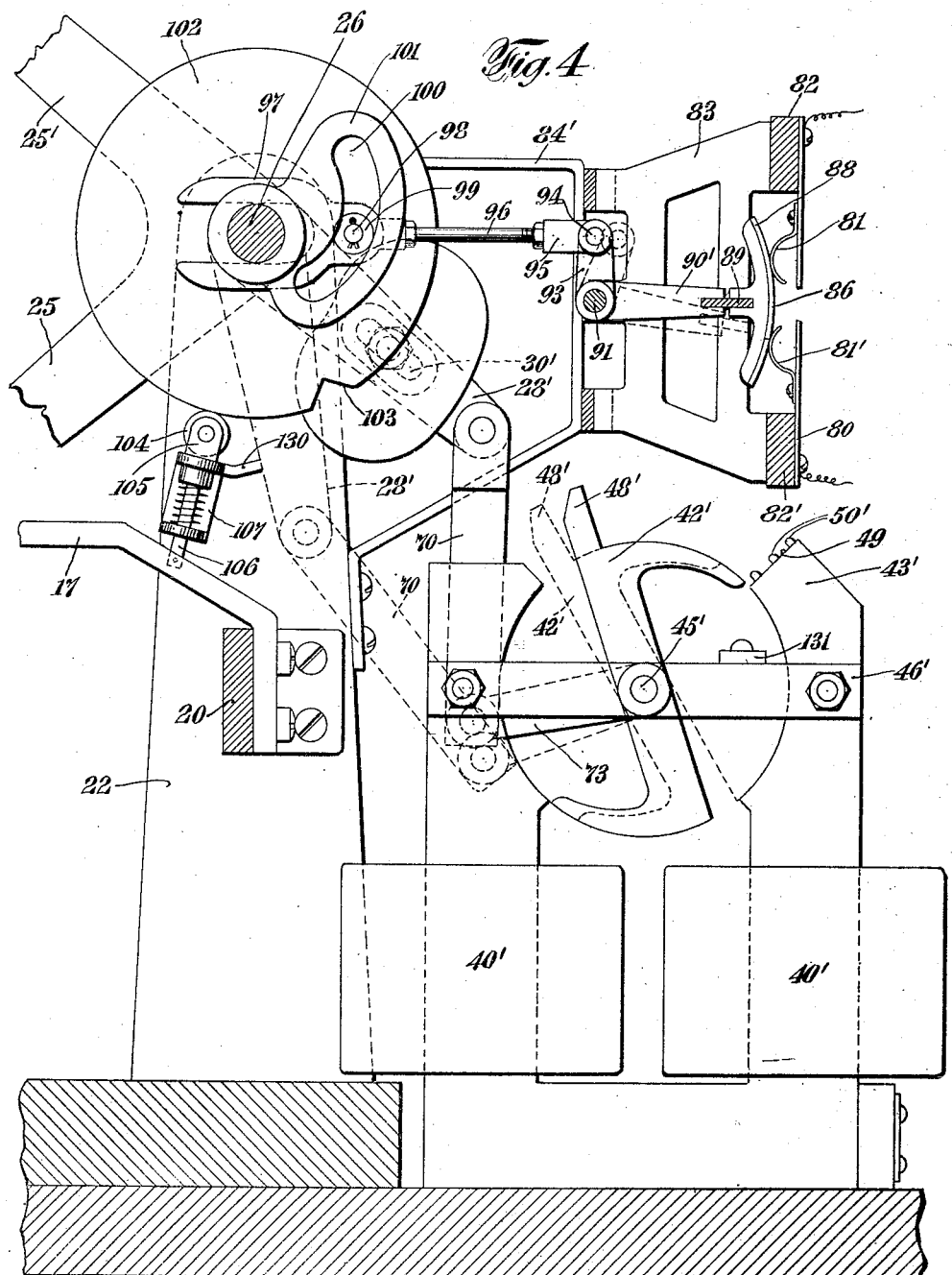

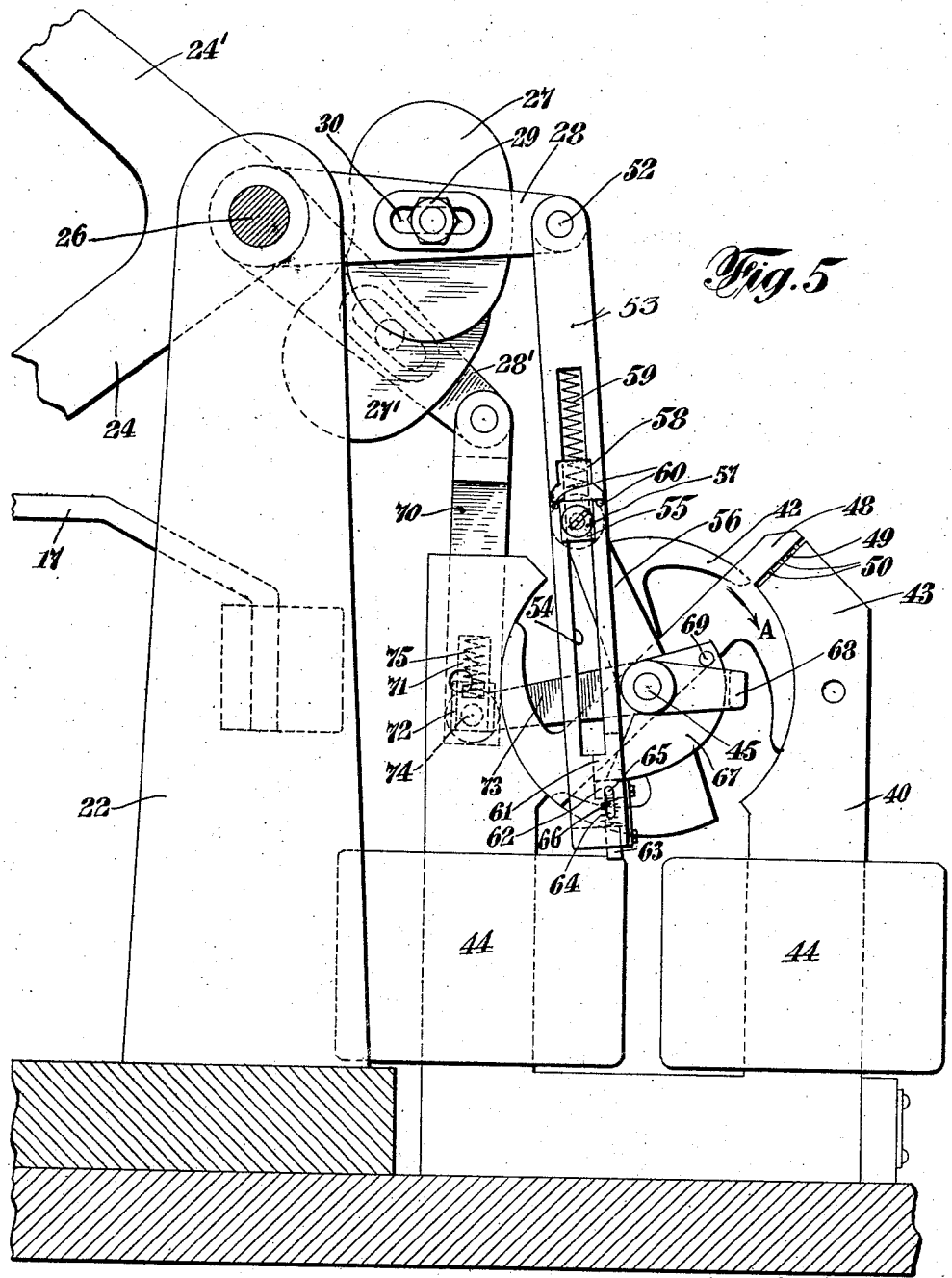

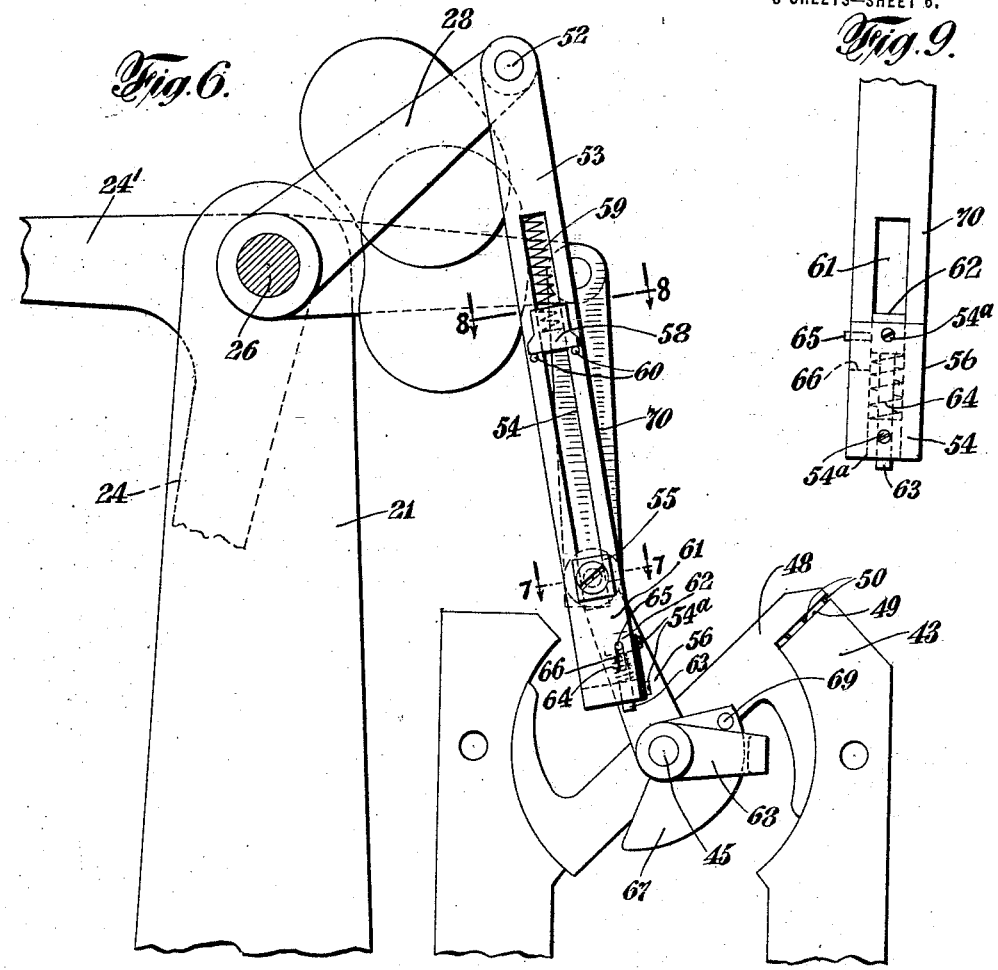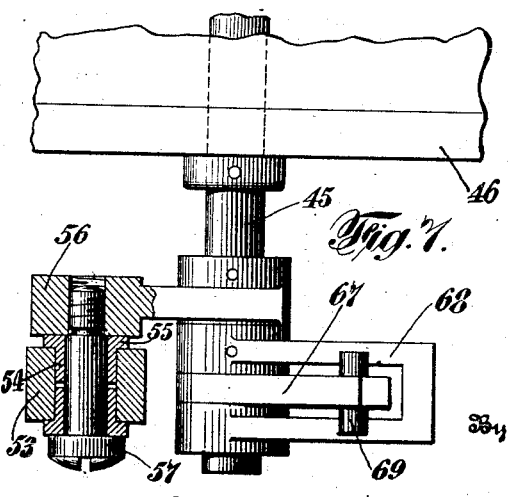

C. H. MORRISON AND F. H. NICHOLSON.
SIGNAL APPARATUS.
APPLICATION FILED JULY 31, 1918.
1,340,970.
Patented May 25, 1920.
8 SHEETS—SHEET 7.
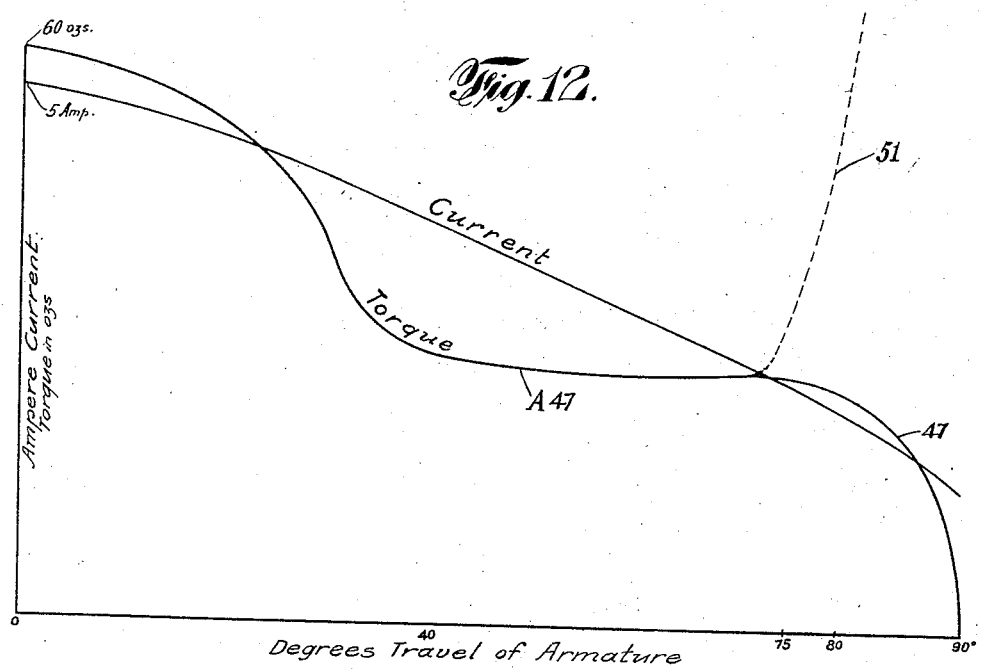
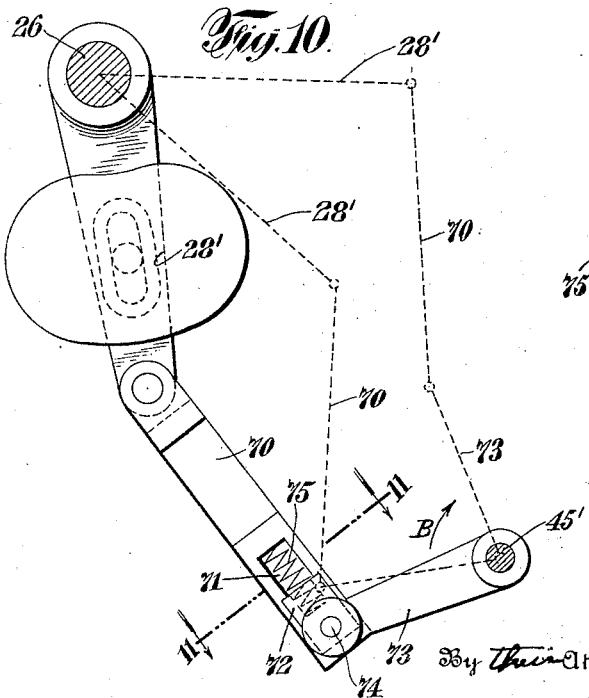
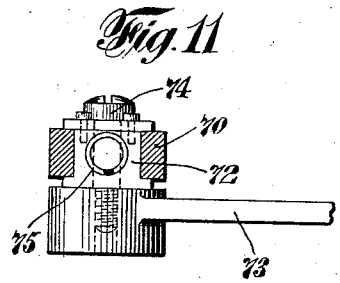

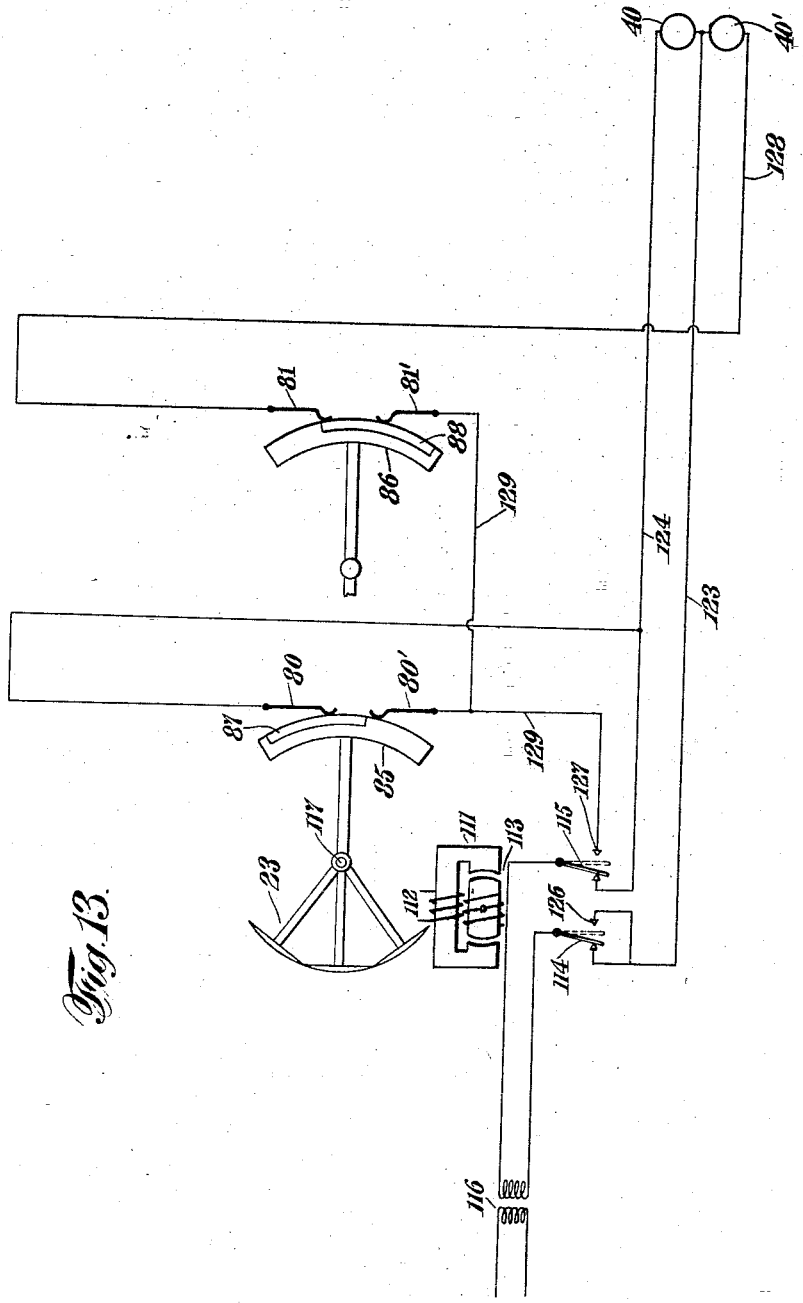

UNITED STATES PATENT OFFICE.

CHARLES H. MORRISON AND FRANK H. NICHOLSON, OF NEW HAVEN, CONNECTICUT.

SIGNAL APPARATUS.

1,340,970.        Specification of Letters Patent.       Patented May 25, 1920.

Application filed July 31, 1918. Serial No. 247,484.

*To all whom it may concern:*

Be it known that we, CHARLES H. MORRISON and FRANK H. NICHOLSON, both citizens of the United States, and residents, respectively, of New Haven, county of New Haven, State of Connecticut, have invented certain new and useful Improvements in Signal Apparatus, of which the following is a specification.

Our invention relates to signal apparatus, and the invention is especially useful in railway signal apparatus.

In signal apparatus of the type where a frame carrying signal-indicating means is moved by a motor device from one position to another and returned by gravity to said position, particularly where certain forms of electric motors are used, difficulty has heretofore been experienced in arresting or stopping and also in holding the frame accurately at some of its indicating positions, due to the momentum of the frame tending to carry it past or from these positions. Various electro-mechanical and other types of brakes and holding devices have been devised to overcome these difficulties, and one of the objects of our invention is to provide simple, durable and efficient means to enable the signal frame actuating motor, while energized, to more securely hold the frame at its operated position to which it is moved by the motor against any swinging tendency, and also to prevent the backward swing of the frame under gravity from some other position from moving the motor armature from its energized position at which position it is supposed to hold the frame while energized.

Another object of the invention is to provide means for reducing the force acting on the motor armature tending to move it from its energized position due to the momentum of the swinging frame as it swings from "clear" to "caution" position.

Another object of the invention is to provide durable and efficient means for arresting and holding the signal frame at "caution" position until moved under proper control to the "clear" position.

Another object of the invention is to provide durable and efficient signaling apparatus which will prevent "phantom" signal indications.

Another object of the invention is to provide a durable and efficient roundel frame coöperating with the signal light.

A further object of the invention is to provide two separate motor devices for moving the signal frame one to "caution" and the other to "clear" or "proceed" position with the circuits to the second or 90-degree motor controlled directly by the movements of the signal frame carrying the colored roundels.

Our invention consists in the novel features and combinations of parts hereinafter described in their preferred embodiment, and the invention will be more particularly set forth in the appended claims.

Further objects and advantages of the invention will more fully appear from the following description taken in connection with the accompanying drawings illustrating a three-position light signal mechanism embodying the preferred form of the invention.

For purposes of convenience and simplicity in the following description of the apparatus, the positions that the signal frame assumes when the signal-indicating means is indicating "clear," "caution," or "danger," will be referred to, respectively, as "clear," "caution" and "danger," and it will be understood that these terms are, respectively, synonymous with the terms "proceed," "caution" and "stop." Also, the motor which actuates or moves the signal frame from "danger" to "caution" will be referred to as the 45-degree motor, and the motor which moves the frame from "caution" to "clear" will be referred to as the 90-degree motor, notwithstanding the fact, as is understood by those skilled in the art, that neither of the armatures of these motors or the signal frame need necessarily move through actually 45 or 90 degrees, the path or the angle that each moves through depending entirely upon the design, form and arrangement of the operating parts. It will further be understood that wherever in the description or claims the term "armature" is used, it refers to the movable member of the electromagnetic motor, no matter what type the motor may be, or what form the part may assume, and that the term "field" refers to the stationary part.

In the drawings,

Fig. 2 is a rear elevation of the casing inclosing the apparatus, with the rear door open to show the signaling mechanism;

Fig. 3 is an enlarged horizontal section taken on line 3—3 of Fig. 1;

Fig. 4 is an enlarged elevation of a part of the apparatus taken on line 4—4 of Fig. 2, with the signal frame partly broken away and at the "caution" position, and showing the 90-degree signal frame operating motor and the mechanism connecting same with the frame in two different positions;

Fig. 5 is an enlarged elevation taken on line 5—5 of Fig. 3, with the signal frame partly broken away and in the "caution" position; and showing the 45-degree motor;

Fig. 6 is a view similar to Fig. 5, but with the motors and frame-connecting parts shown in the positions assumed with the signal at "clear;"

Figure 1:
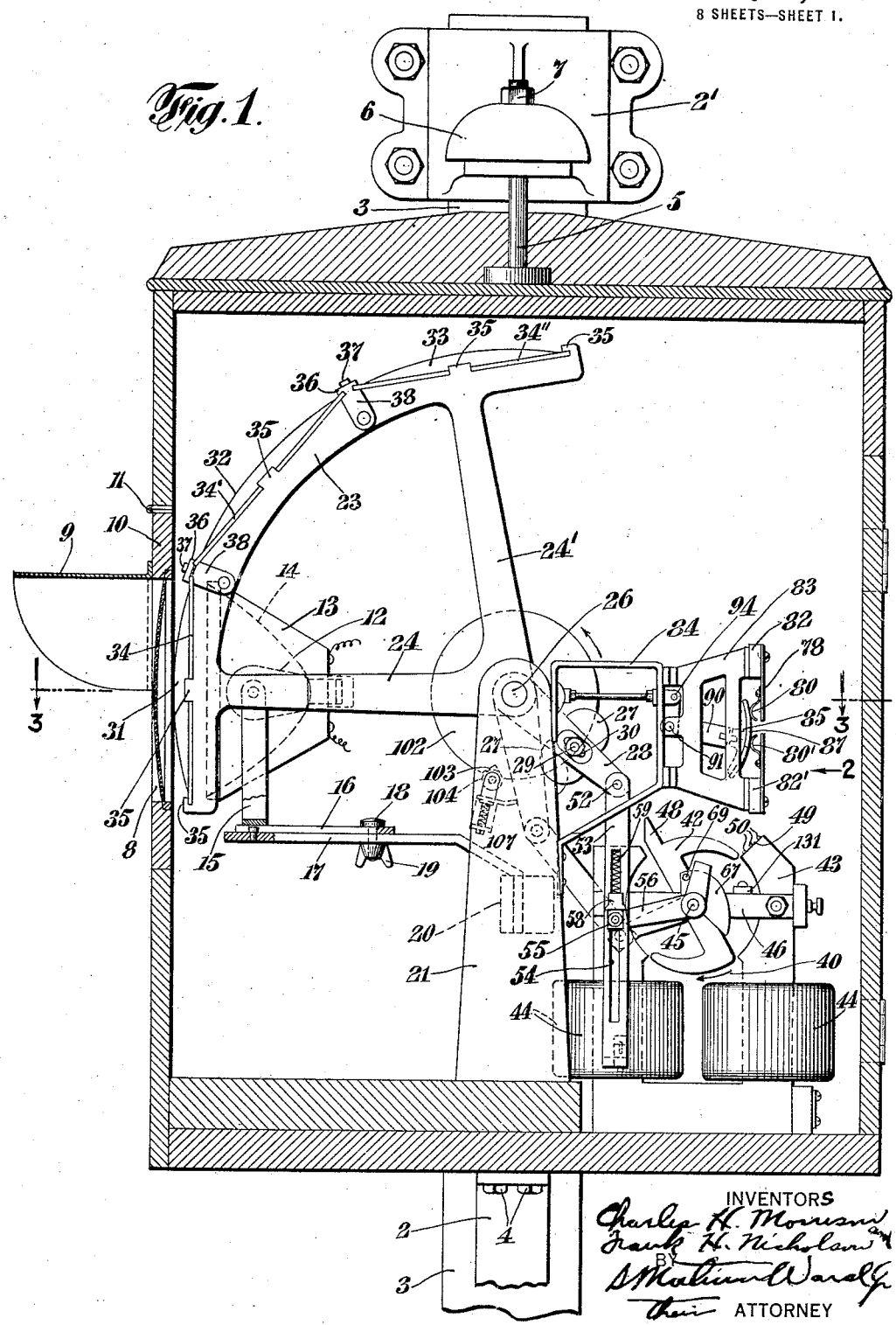
Figure 1 is a side view taken on sectional line 1—1 of Fig. 2, illustrating the present embodiment of the invention.

Figs. 7 and 8 show enlarged details of a part of the apparatus taken respectively on lines 7—7 and 8—8 of Fig. 6;

Fig. 9 is an enlarged detail of part of the apparatus shown in Fig. 6;

Fig. 10 is a detail of part of the connecting mechanism for the 90-degree motor with a diagrammatic illustration of two of its operated positions;

Fig. 11 is a detail of a part of the same taken on line 11—11 of Fig. 10;

Fig. 12 shows diagrammatic curves illustrating the increased torque of the motors due to one feature of our invention; and Fig. 13 is a diagrammatic illustration of one form of suitable electrical connections for controlling and operating the mechanism.

Referring to the drawings (Figs. 1 and 2), 1 is a suitable housing or casing, in this instance shown of wood, mounted on any suitable support in the desired locality or position, and supported by brackets 2, 2′ from a post 3, the bottom of the casing being secured to the lower bracket by screws 4, and the top of the casing being secured to the upper bracket by a bolt 5 passing through the bracket and through a suitable cap-like washer 6 and receiving a holding nut 7. The front of the casing is provided with a clear-glass window or light opening 8, the upper portion of which is surrounded by a protecting hood 9, as and for the purposes well understood in the art. This hood and window 8 are mounted on a swinging door 10 hinged at 11 to the front of the casing. Back of this window and in alinement with the same there is a suitable source of light, shown in the form of an electric bulb 12 suitably mounted in a hood 13 having a suitable reflector, in this instance shown as in the form of a parabolic reflector 14.

The hood 13 is secured in position behind the window in any suitable manner, and is herein shown (Figs. 1 and 3) as mounted on an upright U-shaped frame 15 the bottom of which is rigidly secured to the forward end of a slide bar 16 slidably mounted on the upper surface of a supporting bracket 17 to which the bar is normally rigidly clamped by means of bolt 18 and nut 19. When this nut is loosened the frame 15 may be moved rearwardly and swung outwardly to one side for cleaning purposes, as shown in Fig. 3, and as will hereinafter more fully appear.

The bracket 17 is supported in any suitable manner, and is herein shown (Figs. 1 and 4) as bolted to a horizontal cross bar 20 extending between and secured to uprights 21, 22.

The signal frame 23 is in the general form of a sector having two radial arms 24, 24′ and 25, 25′ on each side rigidly secured to shaft 26 journaled in the uprights 21, 22. This rocking signal frame or cradle is counterweighted in any suitable manner, as for example by counterweights 27, 27′ shown in the drawings as kidney-shaped and adjustably secured respectively to crank arms 28, 28′ (Fig. 4) by means of bolts 29, 29′ passing from the counterweights through slots 30, 30′ in the crank arms 28, 28′. The crank arms 28, 28′ are rigidly secured to shaft 26 so that in reality they are rigidly connected with the signal frame 23 to swing about the axis thereof, and may be regarded as forming a part or rearward extension thereof. The two weights are sufficient to counterbalance the frame 23 and connected parts so as to swing or rock it upward to the "danger" position when not acted upon by any motor device.

The frame in this instance is provided with three colored lenses for three-position signaling, a red lens 31 at its lower end, an intermediate yellow lens 32, and an upper green lens 33. These lenses are secured to the frame in any suitable manner and are herein shown as being provided each with a flat peripheral flange 34, 34′, 34″ which is engaged by clips 35. The lenses 31 and 33 are slid in between their two diametrically opposite clips 35 and into engagement with their end clips 35, and lens 32 is slid in between its diametrically opposite clips 35, whereupon the lenses are firmly held in place by clamps or washers 36 secured to the frame by screws 37 screwed into cross pieces 38 carried by the frame.

By having the signal frame so pivoted and counterweighted that the front part of the frame carrying the colored roundels is biased to be moved by gravity upwardly to indicate "danger" instead of downwardly, a greater degree of safety and reliability is obtained due to the fact that with this arrangement the loss or breaking of the roundels will increase the bias of the signal frame to gravitate to the "danger"—or "stop"—indicating position. And the weight of these roundels has to be taken into consideration due to the relatively narrow margin of over balance relied upon to cause inclosed signal frames to gravitate to the "danger" position. The balance is made relatively delicate with a view to economy in the energy consumed in operating the same.

The signal frame is operated by two separate and independent motive devices shown in the form of two electromagnetic motors 40, 40' (Figs. 1, 2 and 3), the motor 40 being the 45-degree motor, namely, the one that moves the signal frame into its intermediate position with the yellow lens 32 before the window to give a "caution" signal, and the motor 40' being the 90-degree motor or the one to move the frame into position to bring the green lens 33 before the window to give a "clear" signal.

The motors herein shown are of the Z armature type, and are substantially duplicates. This type (referring to motor 40, Fig. 1) has a pivoted armature 42 of general Z form concentrically pivoted with respect to its field poles 43 which are energized by coils 44, the armature in this case being rigidly secured to shaft 45 journaled in cross bars 46 secured to the field poles. This type of motor, and some others operating on the same general principle, are, with the exception of one characteristic, especially desirable as signal-actuating motors because they are inexpensive, simple, durable, easily repaired and readily inspected, and when laminated they may be used in A. C. or D. C. signaling systems. Their disadvantage heretofore as signal-actuating motors has been due to the fact that as their armatures move from their deënergized position, as shown in Fig. 1, to their energized position—namely, with their peripheral portions coinciding or registering with the field poles—the armatures lie almost neutral in the magnetic field—i. e., they are capable of swinging a slight distance in either direction without substantially lengthening the magnetic path between the field poles through them, as is well understood by those skilled in the art. In other words, the torque of their armatures when near said neutral position tending to move them exactly to their neutral position and their ability at said position to resist any backward or rocking movement of the frame is relatively slight, the force exerted by them being too small to accurately and steadily hold the signals in position. This is indicated by the characteristic torque curve 47 of a Z armature shown in Fig. 12, from which it will be seen that the torque rapidly drops as the armature moves from its deënergized or zero position toward its 90-degree or neutral position, the torque rapidly falling off from approximately the 77-degree position to the 90-degree position at which it is practically zero.

One of the objects of the present invention is to increase the torque of a motor, and particularly of one having this general characteristic, at the operated or energized position of its armature, so as to overcome this serious objection and thus render motors of this general type much more desirable and reliable as signal-actuating motors. To this end I provide means for increasing the torque of the motor as the armature approaches its energized position. In the present form of the invention where a Z form of armature is used, this is accomplished most desirably by providing an outward peripheral projection 48 of magnetic material at the base or trailing edge of one of the peripheral portions of the armature which coöperates with a stationary magnetic portion preferably the upper or leading edge 49 of one of the field poles. It will be understood that as the armature 42 approaches its neutral or energized position there will be a direct magnetic attraction or pull between the coöperating portions 48 and 49, which rapidly increases as the two parts approach each other and until the movement of the armature is arrested by engagement of projection 48 with suitable stops 50 of non-magnetic material to prevent sticking. The parts 48 and 49, it will be observed, provide a shunt magnetic path across the air gap between the adjacent peripheral portion of armature 42 and coinciding field pole 43. The effect of this in increasing the torque of the armature at and near its energized or operated position, at which the signal frame is moved to one of its indicating positions, is illustrated by the upright dotted line 51 in Fig. 12 extending upwardly from the full line torque curve 47. This shows that the magnetic force between this projection and field pole comes into play and commences to be effective when the armature reaches approximately its 77-degree position, from which position the magnetic pull between the field pole and this projection is so great as to practically double or more than double the torque of a regular or standard "Z" armature at the 80-degree position, which is the position at which the armature is arrested in the present form of the invention, after it has moved the signal frame to the "caution" or to the "clear" position.

It will be understood by those skilled in the art, after understanding this feature of my invention, that this result may be accomplished by other and different specific means, and that the means employed may be varied in and according to its application to Z-type armatures as well as to armatures of other types of electromagnetic actuating means.

The arrangement and construction of the parts of the 90-degree motor are substantially identical in all respects with those so far described in connection with the 45-degree motor, so the description of the same need not be repeated.

The means for operatively connecting the motors 40 and 40' with the signal frame to move the latter, is as follows, reference being first had to the motor 40 or 45-degree motor: The means connecting this motor with the signal and the operation of the same will be more readily understood by reference to Figs. 1, and 5 to 9. In Fig. 1 the armature 42 is shown as in the deënergized position and the signal frame at "danger." The crank arm 28 extending from the signal frame shaft 26 has its outer end pivotally connected at 52 to the upper end of a swinging link 53 provided with a slot 54, and in this slot is mounted a slide block 55 pivotally connected with crank arm 56 rigidly secured at its other end to the motor shaft 45. This pivotal connection is made by means of a screw 57 (Fig. 7) passing freely through the slide block and threaded into the outer end of the crank arm 56. In the upper end of the slot 54 is mounted a second slide 58 with a compression spring 59 interposed between it and the upper end of the slot normally forcing the slide 58 down into engagement with stop pins 60.

The lower end of the link 53 (Figs. 5, 6 and 9) is provided with a short slot 61 or cavity formed at right angles to the slot 54, and a third slide 62 is mounted in this slot and provided with a centering pin or shank 63 extending through the lower end of the link and around which is coiled a compression spring 64. This spring normally holds the slide 62 in its upper position shown in Figs. 6 and 9. The slide is provided with a transverse stop pin 65 operating in a slot 66 the ends of which limit the movement of said slide and pin. This slide 62 is for the purpose of coöperating with a suitable latch for arresting the upward movement of the link 53 after the signal frame has been moved by the motor to the "caution" position. A plate 54 is fastened by screws 54ᵃ to the slide 62 and covers the lower portion of slot 61 containing compression spring 64, and prevents the entrance of the point of cam 67 into the lower end of slot 61, as will be hereinafter evident. This cam 67 is freely swiveled on shaft 45 (Fig. 7) between the legs of a U-shaped bracket 68 keyed to motor shaft 45 to rock therewith. The cam 67 is provided with a transverse pin 69 adapted to be engaged by said bracket 68 to control the movements of the cam, as hereinafter described.

With the parts in position as shown in Fig. 1, if the motor 40 is energized the armature and actuating crank 56 are swung in the direction of the arrow in Fig. 1, whereupon the slide 55 operates on slide 58 and through spring 59 on the link to move the link upward, thus forcing crank arm 28 up against the action of the counterweights to move the signal frame to its intermediate or "caution" position. The compression spring 59 is strong enough to overcome the inertia of the signal frame and transmit the force thereto, although it may yield somewhat due to the first impact from slide 55. As link 53 is moved upwardly and crank arm 56 is swung toward the position shown in Fig. 5, the lower end of the link is caused, by the upward and clockwise movement of slide 55, to swing toward the motor axis, as shown by the arrow A in Fig. 5, and simultaneously therewith, the clockwise rotation of motor shaft 45 carrying the U bracket 68, moves the bracket away from stop pin 69, thus permitting the cam 67 to swing downwardly from the position shown in Fig. 1 to the position shown in Fig. 5, into the slot 61 and into engagement with the top of slide 62. The nose of the cam engages the top of slide 62 simultaneously with or slightly after the signal frame reaches the "caution" position, and any further movement of the signal frame, by virtue of its momentum, is resisted by the compression force of spring 64, so that further movement of the signal frame is arrested without undue shock on the connected parts. As soon as the rotation of the signal frame and the upward movement of link 53 are arrested as described, the frame and connected parts settle back very slightly until the spring 64 is extended to its former length, and the downward force of the load on link 53 is then carried by sliding block 55 through sliding block 58 and spring 59.

When the control circuits hereinafter described deënergize the motor 40 with the signal frame in this position, the armature, crank arm 56 and the U-shaped bracket 68 swing in a counter-clockwise direction from their positions shown in Fig. 5, the result of which is that slide 55 is moved away from slide 58, permitting the link 53 to drop (and the bracket 68 engages the cam pin 69, tilting the cam out of slot 61 and back to the position shown in Fig. 1), the signal gravitating to the "danger" position shown in Fig. 1.

It will be seen from the above that the cam 67 and controlling bracket 68 form no part of the means for actuating the signal frame by the motor, but constitute means for arresting the frame at the "caution" position from further downward swing.

The connections for moving the signal from "caution" to "clear" due to the energization of the motor 40' or the 90-degree motor, are somewhat different from those just described, and they are best shown in Figs. 4, 5, 6 and 10.

Referring to Figs. 5 and 10, it will be seen that the connections are as follows: To the outer end of crank arm 28' keyed to shaft 26, is swiveled a link 70 the lower end of which is provided with a short slot 71 in which moves a slide 72 pivotally connected to crank arm 73, the other end of which is rigidly keyed to the armature shaft 45' of the 90-degree motor, the pivotal connection of said slide 72 to the crank 73 being substantially like that heretofore described between link 53 and crank 56 for the 45-degree motor and is shown in Figs. 10 and 11. A compression spring 75 is provided between the upper end of the slot and the top of the slide 72 for the purpose of taking up shock between the slide 72 and the link 70 in the operation of the frame.

As is understood in three-position signaling mechanism, it is desirable that the 90-degree motor shall not be capable of moving the signal frame in the direction from the "danger" toward the "clear" position until the 45-degree motor has first moved the frame to the "caution" position; and aside from arranging the electrical connections to the 90-degree motor so that they are completely responsive to the movement of the signal to the "caution" position, the operation of the signal by the 90-degree motor is further safeguarded by so arranging the crank arms 28' and 73 and the connecting link 70, that the link is incapable of moving crank arm 28' to rock the signal frame upwardly from the "danger" position toward the "clear" position until the frame has been moved to the "caution" position, or substantially thereto, by the 45-degree motor. These parts are best shown in their inoperative position in Fig. 10, at which position the frame is at "danger", and it will be seen that the link 70 lies to the left or on the wrong side of a central line connecting shaft 26 and swiveled pin 74 of crank 73 to permit the link to move arm 28' in position to rock the signal frame downward should the 90-degree armature be energized to move arm 73 in a clockwise direction as shown by the arrow B in Fig. 10. With the parts in their positions shown in Fig. 10, if the 90-degree armature is energized to rock arm 73 in the direction indicated, it will only have the tendency to move the signal frame upward to the "stop" position instead of downward toward the "clear" position. However, the movement of the signal frame to the "caution" position by the 45-degree motor as heretofore described, will swing crank arm 28' and link 70 to the adjacent diagrammatic position shown just to the right of these parts in Fig. 10, which is the position they assume with the signal at "caution". In this position it will be seen that the link and levers are so related that when the 45-degree motor is deënergized and the 90-degree motor is energized to rotate crank arm 73 clockwise, this will move the link up and swing the signal frame down toward the "clear" position, the parts finally reaching the second diagrammatic position indicated in Fig. 10, which they occupy with the signal at "clear". This the second position of the parts is also shown in Fig. 6.

The circuits to the two motors 40, 40' are controlled by an electric controller or switch mechanism 78 mounted at the rear of the standards 21, 22, and above the motors, as more clearly shown in Figs. 1, 2 and 4. The stationary contacts 80, 80' controlling the circuit to the 45-degree motor and the stationary contacts 81, 81' controlling the circuit to the 90-degree motor, are mounted on suitable insulating bars 82, 82' at the rear of a frame 83 suitably secured to brackets 84, 84' supported from the rear of the uprights 21, 22. The movable part or commutator of the controller is in the form of two segments 85, 86, preferably of insulating material, the segment 85 carrying an electrical contact 87 adapted to close the circuit to the 45-degree motor through contacts 80, 80', and the segment 86 having a contact 88 adapted to close the circuit to the 90-degree motor through contacts 81, 81'. These segments are secured to a bar 89 connecting the segments to crank arms 90, 90' secured to rocker shaft 91 journaled in frame 83 at 92, 92'. The rocker shaft is actuated by means of crank arm 93 rigidly secured at one end to the shaft and having its other end pivoted at 94 to a slotted coupling head 95 threaded on a rod 96, the other end of which is threaded into the base of a forked member 97, slidingly fitting signal shaft 26. This forked member is provided with a lateral pin 98 carrying a roller 99 operating in a cam slot 100 formed in cam member 101 keyed to shaft 26 substantially centrally of its length, as shown in Fig. 3.

With this mechanism when the frame is at the "danger" position, contact 87 bridges contacts 80, 80' in the circuit of the 45-degree motor, and with the frame in the "caution" position the commutator is moved to the position shown in Fig. 4, where contact 88 bridges contacts 81, 81' in the circuit to the 90-degree motor, at which time contact 87 has moved to break the circuit between contacts 80, 80' of the 45-degree motor. The contacts are so arranged that the circuit to the 45-degree motor is broken shortly before the frame reaches the "caution" position and just before the contacts 81, 81' to the 90-degree motor are closed.

The opening of the circuit at contacts 80, 80' does not deënergize the 45-degree motor when the track relay armature (as will hereinafter be described) is in position to close the circuit to this motor to hold the signal at "caution."

In order to prevent any possibility of the frame oscillating or swinging slightly at the "danger" position, at which position none of the motor armatures will be energized, a disk 102 (Figs. 1 and 4) is provided secured to shaft 26 of the signal frame, and having a notch 103 which, when the signal frame is at "danger," registers with a spring-pressed roller 104 mounted in the forked head 105 of a rod 106 which is in turn slidingly mounted in the upper and lower arms of a U-shaped bracket 107 secured to the side of upright 22. When the 45-degree motor is energized, the inclined sides of the notch depress the roller 104 and permit the frame to be moved, but any slight tendency to oscillate when the frame returns to the "stop" position will be resisted by the action of the roller against the sides of the notch 103.

With regard to the operation of the device, it will be understood that any suitable arrangement of control circuits may be utilized in connection with the mechanism described, depending upon the use to which it is to be put and the character of signaling system in which it is desired to be used, but I have shown in Fig. 13 suitable control circuits for operating the mechanism in conformity with standard signaling practice.

Referring to Fig. 13, 111 illustrates diagrammatically a polarized relay one of the coils 112 of which is supplied from a suitable line circuit (not shown) with alternating current, while the other coil 113 of which is supplied with alternating current from the track (not shown), as is well understood. The armature of the polarized relay operates two contacts 114, 115 connected, respectively, to a suitable source of alternating current indicated by transformer 116, that may also be connected to a line circuit, as is well understood. The signal frame 23 is shown diagrammatically as pivoted at 117 and as carrying the contact 87 operatively related to contacts 80, 80' as shown, and contact 88 operatively related to contacts 81, 81' as shown, respectively connected to the 45- and 90-degree motors 40, 40'. When the railway signal block to be protected by this mechanism is occupied by a car, the track coil 113 of relay 111 will be deënergized, and contacts 114, 115 will be in the position indicated diagrammatically by dotted lines, in which position neither of the circuits to the motors 40, 40' will be closed; and under these conditions the signal frame 23 will be at "danger," in position where contact 87 is in engagement with contacts 80 and 80', but contact 88 is out of engagement with contacts 81 and 81'. When the car passes out of the block the track coil 113, as is well understood, is energized, thereby swinging contacts 114 and 115 into the position shown in full lines, thus closing the circuit from the source 116 to the 45-degree motor, as follows: through contact 115, wire 124, 45-degree motor 40, wire 123, and through contact 114 back to source. This energizes the motor, causing it to move the signal frame to "caution" position, as heretofore described, and through the controller mechanism at the rear of the signal frame, to close the contacts 81, 81' in the circuit of the 90-degree motor, and open the branch circuit to the 45-degree motor at contacts 80, 80'. But as long as the track conditions warrant a "caution" indication and the armatures 114, 115 of the track relay remain in the full-line position shown, the 45-degree motor is held energized to hold the signal at "caution" and the 90-degree motor is not energized, notwithstanding the closing of its circuit at contacts 81, 81', until the track relay armatures are swung to the right due to track conditions warranting a "clear" or "proceed" signal.

As heretofore described, the cam 67 has at this, the "caution" position of the signal, swung down into engagement with the slide 62 carried at the lower end of link 53 to stop the signal frame from moving beyond the "caution" position.

When the car moves out of the succeeding block and into the second succeeding block the current in the track circuit of the first block, and hence that in the track relay coil 113, is reversed, as and by mechanism well understood, thereby moving the railway armature contacts 114, 115 to the right into engagement with contacts 126, 127, closing the circuit to the 90-degree motor as follows: From source 116, through contacts 115 and 127, to wire 129, contacts 81, 86 and 81', wire 128, 90-degree motor 40', wire 123 and contacts 126 and 114, back to the source 116, thus energizing the 90-degree motor and moving the signal to the "clear" position. The cam latch 67 will disengage slide 62 in slot 61 of link 53 to allow movement of the signal frame from the "caution" position to "clear" because the momentary deënergization of the 45-degree motor when contacts 114, 115 swung to the right to close the 90-degree motor circuit, permitted the armature 42, crank arm 56 and cam-controlling bracket 68 to momentarily swing counterclockwise, thus swinging the cam 67 and the lower end of link 53 away from each other to disengage the cam and link and permit the signal frame to move to "clear" position.

If a car should back from the second succeeding block into the first succeeding block so as to require the signal to move from the "clear" to the "caution" position, the relay contacts 114, 115 would be swung to the left into their positions shown in Fig. 13 to deenergize the 90-degree motor and close the relay contacts controlling the 45-degree motor, whereupon the signal frame will swing up to the "caution" position closing the circuit to the 45-degree motor, and link 53 will simultaneously drop until slide 58 (Fig. 5) strikes slide 55 carried by the crank 56, whereupon spring 59 will yield somewhat, taking up the shock of the swinging frame upon the motor armature and permitting link 53 to move down slightly relative to the armature axis. The downward movement of the lower end of the link will strike the upper left-hand surface of the cam 67, swinging it to the right slightly away from the link, until the slot 61 appears opposite the point of cam 67, whereupon the cam will swing back into the slot 61 above the slide 62; this movement taking place before the recoil of spring 59 moves the link 53 and signal frame back exactly to the "caution" position, where the frame is held from further upward movement by slide 55 on crank 56, and from further downward movement by cam 67.

If the condition of the track circuit is such as to cause the signal to move from "caution" to "danger" the track relay deënergizes the 45-degree motor, permitting link 53 to drop and the signal frame to swing upwardly to the "danger" position.

A projection 130 (Fig. 4) from the U frame 107 is engaged by crank arm 28' when the signal is moved to the "danger" position to prevent further upward swing of the frame. Also, to prevent the wearing down of the nonmagnetic polar projections 50, 50', each of the motors is provided with a stop bar 131, 131' secured to the crossbars 46, 46' of the motors in position to be engaged by the armatures when moved to their respective energized positions.

If conditions arise where the signal should move directly from "danger" to "clear" position without an intermediate stop at "caution," the cam 67 will not interfere with this movement. Referring to Fig. 13, a movement of the signal frame from the "stop" to the "clear" position will be effected when the polarized relay contacts 114, 115 move directly from the deënergized or the dotted-line position to the right, closing contacts 126, 127. With the signal frame in the "stop" position and the relay contacts moved to the right, energy flows from source 116 through contacts 115, 127, wire 129, contacts 80', 87 and 80, wire 124, 45-degree motor 40, wire 123, contacts 126, 114, to source 116. Motor 40 will thereby be energized to move the signal frame to "caution" position. But slightly before the "caution" position is reached, and before cam 67 has entered slot 61 to engage with slide 62, contacts 80, 81' are disconnected by contact 87 moving out from beneath contact 80'. At this point motor 40 is deënergized and the rotation of its armature 42 stops without cam 67 having entered slot 61 above the slide 62. Immediately after contacts 80, 80' are disconnected, contacts 81, 81' are bridged by contact 86, thereby energizing the 90-degree motor 40' as follows: through line 129, contacts 81', 86 and 81, wire 128, 90-degree motor 40', wire 123, contacts 126, 114, to source 116. Motor 40' then moves signal frame on to the "clear" position, as shown by Fig. 6.

While we have described our invention with reference to its preferred form, as shown in the drawings, it will be understood by those skilled in the art, after understanding the invention, that various changes and modifications may be made in the arrangement, construction and relation of the parts to each other, and that certain features of the invention may be utilized without the other features shown and in different combinations from those herein shown and described without departing from the spirit or scope of the invention, and we do not wish to be understood as limiting ourselves other than as indicated in the appended claims.

Having thus described our invention, what we claim as new and desire to secure by Letters Patent, is:—

1. In signaling mechanism, a movable signal part adapted to be moved from one position to another and held there, an electromagnetic motor having an armature operatively related to the signal part and movable to an operated position by the energization of said motor to move said signal part to its operated position, and means coöperating with said motor and rendered effective by the movement of the armature to its said operated position to increase the torque of the motor at said position with respect to its torque at nearby positions.

2. In signaling mechanism, a movable signal part adapted to be moved from one position to another and held there, an electromagnetic motor having an armature operatively related to the signal part and movable to an operated position by the energization of said motor to move said signal part to its operated position, and a magnetic part on one of the motor members rendered effective by the movement of the armature toward its said operated position near the same to produce an increasing torque of the motor as it approaches said operated position.

3. In signaling mechanism, a movable signal part adapted to be moved from one position to another and held there, an electromagnetic motor having field poles and a concentrically journaled armature with two diametrically opposite peripheral magnetic parts, said armature being operatively related to the signal part and movable to an operated position by the energization of said motor to move the signal part to its operated position, said armature at its unenergized position having said magnetic portions lying substantially out of registration with the field poles, and in its operated position lying substantially neutral to the magnetic flux from the poles and in register with said poles, and a projection of magnetic material from one of said motor members coöperating with the other and rendered effective in the movement of said armature to its operated position to produce magnetic attraction between said projection and its said coöperating member, which increases with the movement of the armature to its said operated position, so as to considerably increase the torque of the motor as it approaches its operated position near the same.

4. In signaling mechanism, a movable signal part adapted to be moved from one position to another and held there, an electromagnetic motor having field poles and a concentrically journaled armature with two diametrically opposite peripheral magnetic parts, said armature being operatively related to the signal part and movable to an operated position by the energization of said motor to move the signal part to its operated position, and said armature and field poles being such that the torque of the armature first diminishes as it moves from its unenergized to its operated position, and means providing a shunt magnetic path around the air gap between said armature and one of said poles, the magnetic reluctance of which path abruptly decreases as the armature approaches its operated position and being a minimum thereat so as to considerably increase the torque of the armature substantially at said operated position with respect to its torque at nearby positions.

5. In a signaling mechanism, a movable signal part adapted to be moved from one position to another and held there, an electromagnetic motor having field poles and a concentrically journaled armature with two diametrically opposite peripheral magnetic parts, said armature being operatively related to the signal part and movable to an operated position by the energization of said motor to move the signal part to its operated position, said armature at its unenergized position having said magnetic portions lying substantially out of registration with the field poles, and in its operated position having said magnetic portions lying more nearly in register with said poles, and a projection of magnetic material from one of said motor members coöperating with the other in such manner that the movement of said armature toward its operated position near the same renders effective an increasing torque of the motor.

6. In signaling mechanism, a movable signal part adapted to be moved from one position to another and held there, an electromagnetic motor having field poles and a concentrically journaled armature with two diametrically opposite peripheral magnetic parts, said armature being operatively related to the signal part and movable to an operated position by the energization of said motor to move the signal part to its operated position, and means providing a shunt magnetic path around the air gap between said armature and one of said poles, the magnetic reluctance of which path abruptly decreases as the armature approaches its operated position, so as to effect an increasing torque of the armature as it approaches its said operated position.

7. In signaling mechanism, a movable signal part adapted to be moved from one position to another and held there, an electromagnetic motor connected thereto the energization of which effects the movement of said signal part to its said operated position, said motor having two opposite poles and an armature of general Z form journaled concentrically of the poles, said armature having a projection of magnetic material at one of its peripheral portions coöperating with one of the poles as the armature approaches its operated position to increase the torque of the armature at its said operated position with respect to its torque at nearby positions before reaching said operated position.

8. In signaling mechanism, a movable signal part adapted to be moved from one position to another and held there, an electromagnetic motor connected thereto the energization of which effects the movement of said signal part to its said operated position, said motor having two opposite poles and an armature of general Z form journaled concentrically of the poles, said armature having an outward peripheral projection of magnetic material from the trailing edge of one of the peripheral armature portions coöperating with a magnetic portion at the leading edge of the corresponding field pole to produce a shunt magnetic path between said projection and field portion to effect an increasing torque of the armature as it nears its said operated position.

9. In signaling mechanism, a signal frame having three signal-indicating positions, a motive device and means connecting same with said frame for moving the frame from "danger" to "caution" position, and a second motive device and means permanently connecting same with the frame for moving it from "caution" to "clear," the position of said second connecting means being such with the frame at "danger" position that said second connecting means is rendered inoperative to move the frame toward "clear" position responsive to the operation of said second motive device, and said second connecting means being movable responsive to the operation of the frame from "danger" to "caution" by the first motive device, into position where it is rendered operative to move said frame responsive to the second motive device.

10. In signaling mechanism, a journaled signal frame biased to "danger" position and having three signal-indicating positions, a motive device and means connecting same with the frame for moving the frame from "danger" to "caution" position, and a second motive device and means connecting the same with the frame for moving it from "caution" to "clear," said second connection comprising a pivoted part for moving the frame, a link pivotally connected at one end to said part and at its other end pivotally connected to the motive device, the pivotal connection of said link to said frame-operating part, with the frame in the "danger" position, lying on the wrong side of the line between the pivot of the frame-moving part and the pivot of the link to the motive device to permit the frame to be moved by said link toward the "clear" position, and said pivotal connection of the link to said frame-operating part being movable responsive to the movement of the frame to "caution" by the first motive device, into position where the link is rendered operative to move said frame to "clear."

11. In signaling mechanism, a journaled signal frame biased to "danger" position and having three signal-indicating positions, a motive device and means connecting same with the frame for moving the frame from "danger" to "caution" position, and a second motive device and means connecting same with the frame for moving it from "caution" to "clear," said second connection comprising a journaled crank arm connected with the frame, a journaled crank arm connected with the motive device, a link pivotally connected at its ends to said cranks and with the frame in the "danger" position, lying on the wrong side of the line between the pivot of said first crank and the pivot of the link to said second crank to permit the frame to be moved by means of said link toward "clear" position, said link being movable responsive to the movement of the frame to "caution" by the first motive device, into position where the link is rendered operative for moving said frame to "clear" position.

12. In signaling mechanism, a journaled signal frame biased to "danger" position and having three signal-indicating positions, a motive device and means connecting same with the frame for moving the frame from "danger" to "caution" position, and a second motive device and means connecting the same with the frame for moving it from "caution" to "clear," said second connection comprising a link pivotally connected at one end with the frame and at its other end pivotally connected with the second motive device, said link with the frame in the "danger" position, lying on the wrong side of the line between the pivot of the frame and the pivot of the link to the motive device to permit the link to move the frame toward "clear" position, and said link being movable responsive to the movement of the frame to "caution" by the first motive device, into position where it is rendered operative to move said frame to "clear" position.

13. In signaling mechanism, a movable signal frame biased to "danger" position and having three signal-indicating positions, a motive device and means connecting same with the frame for moving the frame from "danger" to "caution" position, a second motive device and means connecting the same with the frame for moving it from "caution" to "clear", said first connecting means comprising an actuating and an actuated part having a lost motion connection between them for permitting the movement of the actuated part away from the actuating part responsive to movement of the frame by the second motive device from "caution" to "clear", and yielding means interposed in said first connection for reducing the force acting on the first motive device tending to move it from its operated position due to the return movement of the actuated part against the actuating part when the frame swings from the "clear" to the "caution" position.

14. In signaling mechanism, a movable signal frame biased to "danger" position and having three signal-indicating positions, a motive device and means connecting same with the frame for moving the frame from "danger" to "caution" position, and a second motive device and means connecting the same with the frame for moving it from "caution" to "clear", said first connecting means comprising a crank operated by the motive device, a link having a pivotal connection at one end with said crank and at the other end with said signal frame and a lost motion connection between two of said connecting parts for permitting the frame to be moved by the second motive device from "caution" to "clear", and also comprising a yieldable device interposed in said connection for reducing the force exerted on the first motive device tending to move it from its operated position when the signal frame moves from "clear" to "caution" position.

15. In signaling mechanism, a movable signal frame biased to "danger" position and having three signal-indicating positions, an electromagnetic motor having an oscillating armature movable to an operated position by the energization of said motor and means connecting the same with the frame to move the latter from "danger" to "caution" position, a second electromagnetic motor having an oscillating armature movable to an operated position by the energization of the motor and means connecting the same with the frame to move the latter from "caution" to "clear" position, the connection between said first motor armature and frame comprising a link pivotally connected at one end with said frame and having a slot with a pivotal and slidable connection between said slot and armature for permitting the link to be moved with respect to the armature when the frame is moved from "caution" to "clear" responsive to the second motor, and a spring-pressed slide carried by the link and operatively related to said pivotal and slidable connection and adapted to engage the latter when the frame moves from "clear" to "caution" position for reducing the force exerted on the first armature.

16. In signaling mechanism, a movable signal frame biased to "danger" position and having three signal-indicating positions, an electromotive device and means connecting same with the signal frame for moving said frame from "danger" to "caution" position, and a second electromotive device and means connecting the same with the signal frame for moving it from "caution" to "proceed", said first connecting means comprising an actuating and an actuated part having a lost motion connection between them for permitting the movement of the actuated part away from the actuating part responsive to movement of the frame by the second motive device from "caution" to "proceed" position.

17. In signaling mechanism, a movable signal frame biased to "stop" position and having three signal-indicating positions, an electromagnetic motor having an oscillating armature movable to an operated position by the energization of said motor and means connecting the same with the frame to move the latter from "stop" to "caution" position, and a second electromagnetic motor having an oscillating armature movable to an operated position by the energization of the motor and means connecting the same with the frame to move the latter from "caution" to "proceed" position, the connection between said first motor armature and frame comprising a link pivotally connected at one end with said frame and having a slot with a pivotal and slidable connection between said slot and armature for permitting the link to be moved with respect to the armature when the frame is moved from "caution" to "proceed" responsive to the second motor.

18. In signaling mechanism, a movable signal frame biased to "stop" position and having three signal-indicating positions, an electromagnetic motor having an armature and means operatively connecting same with the signal frame and operated by the energization of the motor to move said frame from "stop" to "caution" position, means on one of the motor members rendered effective by the movement of the armature to its said operated position to increase the torque of the motor at its said position, a second motor and means for connecting same with the frame to move the frame from "caution" to "proceed" position, and yielding means interposed in said first connection for reducing the force acting on the armature of the first motor tending to move it from its operated position due to the return movement of the frame.

19. In signaling mechanism, a movable signal frame biased to "danger" position and having three signal-indicating positions, an electromagnetic motor having an armature and means operatively connecting same with the signal frame and operated by the energization of the motor to move said frame from "danger" to "caution" position, means on one of the motor members rendered effective by the movement of the armature to its said operated position to increase the torque of the motor at its said position, a second motor and means for connecting same with the frame to move the frame from "caution" to "clear" position, said first connecting means comprising an actuating and an actuated part having a lost motion connection between them for permitting the movement of the actuated part away from the actuating part responsive to movement of the frame by the second motor from "caution" to "clear" and yielding means interposed in said first connection for reducing the force acting on the armature of the first motor tending to move it from its operated position due to the return movement of the actuated part.

20. In signaling mechanism, a movable signal frame biased to "danger" position and having three signal-indicating positions, an electromagnetic motor having an armature and means operatively connecting same with the signal frame and operated by the energization of the motor to move said frame from "danger" to "caution" position, said motor having two opposite poles and an armature of general Z form journaled concentrically of the poles, said armature having an outward peripheral projection of magnetic material from the trailing edge of one of the peripheral armature portions coöperating with a magnetic portion at the leading edge of the corresponding field pole to produce a shunt magnetic path between said projection and field portion to increase the torque of the armature at and near its said operated position, a second motor and means for connecting same with the frame to move the frame from "caution" to "clear" position, said first connecting means comprising a crank operated in one direction by the armature, a link having a pivotal connection at one end with said crank and at the other end with said signal frame and a lost motion connection between two of said connecting parts for permitting the frame to be moved by the second motor from "caution" to "clear," and a yieldable device interposed in said connection for reducing the force exerted on the armature tending to move it from its operated position due to the return movement of the signal frame.

21. In signaling mechanism, a signal frame having three signal-indicating positions, a motive device and means mechanically connecting same to said frame for moving said frame from "danger" to "caution" position, and a second motive device and means mechanically connecting same to said frame for moving the frame from "caution" to "clear" position, a part of each of said mechanical connections being movable responsive to movement of the frame by the other, the first connection comprising a lost motion connection with its motive device for permitting such movement independent of its motive device, and the position of the connecting parts between said second motive device and frame being such that with the signal frame at "danger" said connecting parts are rendered inoperative to move the frame toward "clear" position until the first motive device has moved the frame to "caution."

22. In signaling mechanism, a movable signal frame biased to "stop" position and having three signal-indicating positions, "stop," "caution" and "proceed," a motive device and means connecting same with the signal frame for moving the frame from "stop" to "caution" position, and a second motive device and means connecting the same with the frame for moving it from "caution" to "proceed," said first connecting means comprising an actuating and an actuated part so arranged as to permit the movement of the actuated part away from the actuating part during the movement of the frame by the second motive device from "caution" to "proceed," and means operatively related to said actuated part and controlled by the movement of the first motive device to arrest further movement of the actuated part and signal frame toward the "proceed" position when the first motive device reaches its said operated position and until the signal frame is moved by the second motive device.

23. In signaling mechanism, a movable signal frame biased to "danger" position and having three signal-indicating positions, an electromagnetic motor and means connecting same with the frame for moving the frame from "danger" to "caution" position, and a second electromagnetic motor and means connecting the same with the frame for moving it from "caution" to "clear," said first connecting means comprising a crank operated in one direction by the first motor, a link having a pivotal connection at one end with said signal frame and having a slot with a pivotal and slidable connection between said slot and crank for permitting the signal frame to be moved by the second motor from "caution" to "clear," and a latch pivoted coaxially with said crank to swing relatively thereto, and adapted to automatically swing into engagement with the link mechanism when the signal frame is moved to "caution" position, to arrest further movement of the frame toward "clear" position while the first motor is energized, and means operatively connecting said crank and latch to move the latter out of engagement with the link mechanism to release the frame when said crank is swung in its opposite direction.

24. In signaling mechanism, a journaled signal frame biased to "danger" position and having three signal-indicating positions, an electromagnetic motor and means connecting same with the frame for moving the frame from "danger" to "caution" position, and a second electromagnetic motor and means connecting the same with the frame for moving it from "caution" to "clear," said first connecting means comprising a crank operated in one direction by the first motor, a link having a pivotal connection at one end with said signal frame and having a slot with a pivotal and slidable connection between said slot and crank for permitting the signal frame to be moved by the second motor from "caution" to "clear," a spring-pressed slide at the bottom of said slot, a cam freely swiveled about the axis of said crank to swing relatively thereto, and adapted to automatically swing into engagement with said slide when the signal frame is moved to "caution" position, to arrest further movement of the frame toward "clear" position while the first motor is energized, and means operatively connecting said crank and cam to move the latter out of engagement with the slide to release the frame when said crank is swung in its opposite direction.

25. In a light signaling mechanism, the combination of an inclosing housing with a signal light opening in the front thereof, a lamp within the housing behind said opening and a reflector for said lamp, a roundel frame pivoted at the rear of the lamp about an axis transverse to the light opening, said roundel frame extending forward of the lamp and having a front portion adapted to swing in a vertical arc in front of the lamp, different colored signal indicating roundels carried by said front portion so as to be sequentially moved in front of the lamp, and means comprising an electric motor for operating said frame.

26. In a light signaling mechanism, the combination of an inclosing housing with a signal light opening in the front thereof, a lamp within the housing behind said opening and a reflector for said lamp, a roundel frame pivoted at the rear of the lamp about an axis transverse to the light opening, said roundel frame extending forward of the lamp and having a front portion adapted to swing in a vertical arc in front of the lamp, different colored signal indicating roundels carried by said front portion so as to be sequentially moved in front of the lamp, an electric motor, and means comprising a link pivotally connected with the frame and with the motor for operating said frame from "stop" position to another indicating position, said connecting means when the frame gravitates toward the "stop" position, causing the motor to be rotated backward.

27. In a light signaling mechanism, the combination of an inclosing housing with a signal light opening in the front thereof, a lamp in the front part of the housing behind said opening and a reflector behind said lamp facing said opening, a roundel frame pivoted at the rear of the reflector about an axis transverse to the light opening, said roundel frame having two side portions extending forward from the pivot, and having a front portion connecting said side portions and adapted to swing in a vertical arc between the lamp and the light opening, different colored signal indicating roundels carried by said front portion so as to be sequentially moved in front of the lamp, and means comprising an electric motor for operating said frame from the "stop" position to another indicating position.

28. In a light signaling mechanism, the combination of an inclosing housing with a signal light opening in the front thereof, a combined reflector and lamp support adjustably mounted within said housing behind said light opening, an electric lamp carried by said support and a reflector also carried by the support at the rear of the lamp, a roundel frame pivoted at the rear of said support about an axis transverse to the light opening, said roundel frame having two side portions extending from the pivot forward of the lamp and having a connecting front portion adapted to swing in a vertical arc between the light opening and the lamp, different colored signal indicating roundels carried by said front portion so as to be sequentially moved in front of the lamp, and means comprising an electric motor for operating said frame from the "stop" position to another indicating position.

In testimony whereof, we have signed our names to this specification.

CHARLES H. MORRISON.
FRANK H. NICHOLSON.